United States Patent
Tomori

(10) Patent No.: US 11,932,760 B2
(45) Date of Patent: Mar. 19, 2024

(54) COLOR RUBBER COMPOSITION FOR TIRE, AND TIRE

(71) Applicant: Toyo Tire Corporation, Itami (JP)

(72) Inventor: Daiki Tomori, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 38 days.

(21) Appl. No.: 17/840,711

(22) Filed: Jun. 15, 2022

(65) Prior Publication Data

US 2023/0012804 A1    Jan. 19, 2023

(30) Foreign Application Priority Data

Jul. 9, 2021 (JP) ................................. 2021-114521

(51) Int. Cl.
| | |
|---|---|
| *C08L 7/00* | (2006.01) |
| *B60C 1/00* | (2006.01) |
| *B60C 13/00* | (2006.01) |
| *B60C 13/04* | (2006.01) |
| *C08L 15/02* | (2006.01) |

(52) U.S. Cl.
CPC .............. *C08L 7/00* (2013.01); *B60C 1/0025* (2013.01); *B60C 13/001* (2013.01); *B60C 13/04* (2013.01); *C08L 15/02* (2013.01)

(58) Field of Classification Search
CPC .............................. B60C 13/001; B60C 13/04
See application file for complete search history.

(56) References Cited

U.S. PATENT DOCUMENTS

2019/0315965 A1* 10/2019 Konishi .................. C08L 91/08

FOREIGN PATENT DOCUMENTS

| CN | 108164847 A | * | 6/2018 | |
|---|---|---|---|---|
| EP | 2690156 A1 | * | 1/2014 | ............. B01J 31/26 |
| JP | 7-228727 A | | 8/1995 | |
| JP | 2002-301904 A | | 10/2002 | |
| JP | 2006-168616 A | | 6/2006 | |
| JP | 2006168616 A | * | 6/2006 | |

OTHER PUBLICATIONS

Machine translation of CN 108164847 (2018, 5 pages).*
Machine translation of JP 2006168616 (2006, 9 pages).*

* cited by examiner

*Primary Examiner* — Brieann R Johnston
(74) *Attorney, Agent, or Firm* — WHDA, LLP

(57) ABSTRACT

A color rubber composition for tires according to an embodiment contains a rubber component, a pigment other than black or white, a petroleum wax, and a white filler. The petroleum wax has a normal/iso ratio (mass ratio) of 70/30 to 90/10. The carbon number distribution for iso components in the whole petroleum wax is 1.0% or less for 25 or less carbon atoms, 4.0 to 8.0% for 26 to 32 carbon atoms, 5.0 to 15.0% for 33 to 44 carbon atoms, and 1.0% or more for 45 or more carbon atoms. The carbon number distribution for normal components in the whole petroleum wax is 5.0 to 18.0% for 25 or less carbon atoms, 40.0 to 48.0% for 26 to 32 carbon atoms, 15.0 to 27.5% for 33 to 44 carbon atoms, and 2.0% or more for 45 or more carbon atoms.

18 Claims, No Drawings

COLOR RUBBER COMPOSITION FOR TIRE, AND TIRE

CROSS-REFERENCE TO RELATED APPLICATION

This application is based upon and claims the benefit of priority from the prior Japanese Patent Application No. 2021-114521, filed on Jul. 9, 2021; the entire contents of which are incorporated herein by reference.

BACKGROUND

1. Field of the Invention

The present invention relates to color rubber compositions for tires, and to tires using same.

2. Description of the Related Art

In some tires, a color rubber is provided at a side portion, for example, the side wall, for decoration and other purposes, and a variety of such tires have been proposed (for example, JP-A-2006-168616, JP-A-2002-301904, and JP-A-7-228727).

SUMMARY

As a rule, ozone resistance is required for rubber compositions used for tires, which are exposed to the external environment. A tire can improve its ozone resistance by incorporating a wax because waxes inhibit ozone degradation of a tire by depositing at the rubber surface. However, a wax, when contained in a color rubber, may cause the rubber to whiten as a result of the wax depositing on the rubber surface and reflecting light by diffuse reflection.

It is accordingly an object of an aspect of the invention to provide a color rubber composition for tires that undergoes small hue changes while maintaining ozone resistance.

A color rubber composition for tires according to an aspect of the present invention comprises 0.2 to 20 parts by mass of a pigment other than black or white, 0.5 to 15 parts by mass of a petroleum wax, and 10 to 150 parts by mass of a white filler relative to 100 parts by mass of a rubber component. The petroleum wax contains normal alkanes and isoalkanes, and has a normal/iso ratio of 70/30 to 90/10 as a mass ratio of normal alkane to isoalkane. The isoalkane content in the whole of the petroleum wax is 1.0 mass % or less for isoalkanes having 25 or less carbon atoms, 4.0 to 8.0 mass % for isoalkanes having 26 to 32 carbon atoms, 5.0 to 15.0 mass % for isoalkanes having 33 to 44 carbon atoms, and 1.0 mass % or more for isoalkanes having 45 or more carbon atoms. The normal alkane content in the whole of the petroleum wax is 5.0 to 18.0 mass % for normal alkanes having 25 or less carbon atoms, 40.0 to 48.0 mass % for normal alkanes having 26 to 32 carbon atoms, 15.0 to 27.5 mass % for normal alkanes having 33 to 44 carbon atoms, and 2.0 mass % or more for normal alkanes having 45 or more carbon atoms.

A tire according to an aspect of the present invention comprises the color rubber composition for tires.

DESCRIPTION OF EMBODIMENTS

A color rubber composition for tires (hereinafter, also referred to as "color rubber composition") according to an embodiment comprises a rubber component, a pigment other than black or white, a petroleum wax, and a white filler. As used herein, "color rubber composition" refers to a rubber composition of a color other than black or white. The color is not particularly limited, and may be, for example, blue, red, yellow, or green.

The rubber component is not particularly limited, and may be any of various rubber components commonly used in rubber compositions for tires. Specific examples of the rubber component include diene rubbers such as natural rubber (NR), isoprene rubber (IR), butadiene rubber (BR), and styrene-butadiene rubber (SBR), and non-diene rubbers such as butyl rubber, and ethylene propylene diene rubber (EPDM). Here, butyl rubber is a concept that includes butyl rubber (IIR) and halogenated butyl rubber (for example, such as chlorobutyl rubber (CIIR) and bromobutyl rubber (BIIR)). The rubber component may be any of these rubbers used alone, or two or more of the rubbers may be used in combination.

In an embodiment, the rubber component may contain a diene rubber and butyl rubber, or may contain a diene rubber, butyl rubber, and ethylene propylene diene rubber. The rubber content in the rubber component is not particularly limited. The content of diene rubber is preferably 20 to 60 parts by mass, more preferably 30 to 50 parts by mass in 100 parts by mass of the rubber component. The content of butyl rubber is preferably 20 to 60 parts by mass, more preferably 30 to 50 parts by mass in 100 parts by mass of the rubber component. The content of ethylene propylene diene rubber is preferably 0 to 30 parts by mass, more preferably 5 to 20 parts by mass in 100 parts by mass of the rubber component.

In an embodiment, the rubber component preferably contains natural rubber, butyl rubber, and ethylene propylene diene rubber. More preferably, 100 parts by mass of the rubber component contains 20 to 60 parts by mass of natural rubber, 20 to 60 parts by mass of butyl rubber, and 5 to 30 parts by mass of ethylene propylene diene rubber. Even more preferably, 100 parts by mass of the rubber component contains 30 to 50 parts by mass of natural rubber, 30 to 50 parts by mass of butyl rubber, and 10 to 20 parts by mass of ethylene propylene diene rubber. The rubber component may contain other diene rubbers and non-diene rubbers, in addition to natural rubber, butyl rubber, and ethylene propylene diene rubber.

The pigment is a colorant used to impart a color other than black or white in the color rubber composition of the present embodiment. The pigment is a color pigment other than black or white. The color pigment excludes a white pigment, which is contained as a white filler. Preferably, the color rubber composition does not contain a black pigment, such as carbon black, because addition of a black pigment cancels the color of the color pigment.

The color pigment is not particularly limited, and may be selected from pigments of various colors, for example, such as blue, red, yellow, and green. Specific examples of the color pigment include inorganic pigments, polycyclic pigments, azo pigments, lake pigments, and fluorescent pigments. Examples of the inorganic pigments include ultramarine, iron blue, red lead, red iron oxide, chrome yellow, and zinc yellow. Examples of the polycyclic pigments include phthalocyanine, anthraquinone, quinacridone, diketopyrrolopyrrole, and perylene. Examples of the lake pigments include basic dye lake, and acidic dye lake. The color pigment may be any of these color pigments used alone, or two or more of the color pigments may be used in combination.

When mixing the color pigment, a premixed masterbatch with the rubber component may be used to improve dispersibility.

The content of the color pigment is 0.2 to 20 parts by mass, preferably 0.5 to 15 parts by mass, more preferably 1 to 10 parts by mass relative to 100 parts by mass of the rubber component. The content of the color pigment may be 2 to 8 parts by mass.

The petroleum wax is a wax formed of saturated hydrocarbons, and contains normal alkanes (linear paraffin) and isoalkanes (branched-chain paraffin). By being present in the rubber composition, the petroleum wax can inhibit ozone degradation of rubber by depositing at the rubber surface and forming a protective film against ozone in the atmosphere.

The present embodiment uses a petroleum wax that satisfies the following conditions (1) to (3).

(1) Normal/iso (mass ratio): 70/30 to 90/10
(2) Carbon number distribution for iso components in the whole petroleum wax:
   25 or less carbon atoms: 1.0 mass % or less
   26 to 32 carbon atoms: 4.0 to 8.0 mass %
   33 to 44 carbon atoms: 5.0 to 15.0 mass %
   45 or more carbon atoms: 1.0 mass % or more
(3) Carbon number distribution for normal components in the whole petroleum wax:
   25 or less carbon atoms: 5.0 to 18.0 mass %
   26 to 32 carbon atoms: 40.0 to 48.0 mass %
   33 to 44 carbon atoms: 15.0 to 27.5 mass %
   45 or more carbon atoms: 2.0 mass % or more A petroleum wax satisfying these conditions (1) to (3) can reduce hue changes at the rubber surface while maintaining ozone resistance. This can be explained as follows, though the following explanation is not intended to be limiting. By satisfying the foregoing conditions (1) to (3), the petroleum wax forms deposits of small crystal sizes on the rubber surface, and reduces whitening by making diffusion reflection of light less likely to occur on the rubber surface. A petroleum wax that does not satisfy the foregoing conditions (1) to (3) is more likely to crystallize at the rubber surface, and forms larger crystals. The larger crystal sizes mean more diffuse reflection and more whitening at the rubber surface.

The normal/iso ratio in condition (1) is the mass ratio of normal alkane to isoalkane in the petroleum wax. The normal/iso ratio is 70/30 or more and 90/10 or less. The normal/iso ratio is preferably 75/25 or more, and is preferably 85/15 or less.

Conditions (2) and (3) represent the mass percentages of iso and normal components relative to total 100 mass % of the petroleum wax. The content of isoalkanes having 25 or less carbon atoms is 1.0 mass % or less, more preferably 0.5 mass % or less. The content of isoalkanes having 26 to 32 carbon atoms is 4.0 to 8.0 mass %, more preferably 4.0 to 7.0 mass %. The content of isoalkanes having 33 to 44 carbon atoms is 5.0 to 15.0 mass %, more preferably 8.0 to 13.0 mass %. The content of isoalkanes having 45 or more carbon atoms is 1.0 mass % or more, more preferably 1.0 to 4.5 mass %.

The content of normal alkanes having 25 or less carbon atoms is 5.0 to 18.0 mass %, more preferably 8.0 to 13.0 mass %. The content of normal alkanes having 26 to 32 carbon atoms is 40.0 to 48.0 mass %, more preferably 42.0 to 46.0 mass %. The content of normal alkanes having 33 to 44 carbon atoms is 15.0 to 27.5 mass %, more preferably 17.0 to 25.0 mass %, even more preferably 18.0 to 23.0 mass %. The content of normal alkanes having 45 or more carbon atoms is 2.0 mass % or more, more preferably 2.0 to 6.0 mass %.

A method of preparation of a petroleum wax satisfying the foregoing conditions (1) to (3) is not particularly limited. In an example method, a concentrated fraction of each component is obtained using a combination of known methods such as distillation under reduced pressure, solvent deoiling, sweating, and pressure deoiling. These fractions can then be mixed in the foregoing proportions to prepare the petroleum wax. For example, commercially available waxes are separated with a column by gas chromatography (GC), and wax components with specific numbers of carbon atoms are separated and collected. These wax components can then be combined and blended to prepare a petroleum wax satisfying the foregoing conditions (1) to (3).

The normal/iso ratio and the carbon number distribution of the petroleum wax can be measured by a known method using gas chromatography.

The content of the petroleum wax is 0.5 to 15 parts by mass, preferably 1 to 15 parts by mass, more preferably 3 to 12 parts by mass, even more preferably 5 to 10 parts by mass relative to 100 parts by mass of the rubber component.

The white filler is not particularly limited. For example, the white filler may contain at least one selected from the group consisting of silica, clay, calcium carbonate, manganese oxide, titanium oxide, magnesium oxide, and zinc oxide.

The content of the white filler is 10 to 150 parts by mass, preferably 30 to 120 parts by mass, more preferably 50 to 100 parts by mass relative to 100 parts by mass of the rubber component. In one embodiment, 30 to 100 parts by mass (more preferably, 50 to 90 parts by mass) of clay, and 5 to 30 parts by mass (more preferably, 10 to 25 parts by mass) of silica and/or titanium oxide may be contained relative to 100 parts by mass of the rubber component. In such an embodiment, 0.1 to 5 parts by mass (more preferably 0.5 to 3 parts by mass) of magnesium oxide, and 1 to 10 parts by mass (more preferably, 2 to 8 parts by mass) of zinc oxide may additionally be contained.

Aside from the foregoing components, the color rubber composition according to the present embodiment may contain various additives commonly used for rubber compositions for tires, for example, such as stearic acid, a vulcanizing agent, and a vulcanization accelerator.

Preferred for use as a vulcanizing agent is sulfur. The content of the vulcanizing agent is not particularly limited, and is preferably 0.1 to 7 parts by mass, more preferably 0.5 to 5 parts by mass relative to 100 parts by mass of the rubber component.

Examples of the vulcanization accelerator include sulfenamide, thiuram, thiazole, guanidine, and dithiocarbamate vulcanization accelerators. These may be used alone, or two or more of these vulcanization accelerators may be used in combination. The content of the vulcanization accelerator is not particularly limited, and is preferably 0.1 to 7 parts by mass, more preferably 0.5 to 5 parts by mass relative to 100 parts by mass of the rubber component.

The color rubber composition according to the present embodiment can be produced by kneading following an ordinary method, using a common mixing machine such as a Banbury mixer, a kneader, or rolls. For example, additives other than vulcanizing agents or vulcanization accelerators are added and mixed with the rubber component, together with the color pigment, the petroleum wax, and the white filler in a first mixing stage (nonproductive kneading step). An unvulcanized rubber composition can then be obtained by adding and mixing a vulcanizing agent and a vulcanization accelerator to the mixture in a final mixing stage (productive kneading step).

The color rubber composition according to the present embodiment can be used for pneumatic tires in a wide range of applications, including, for example, tires for passenger cars, and heavy load tires for trucks and buses. The color rubber composition according to the present embodiment can be used in any portion of a tire. In an embodiment, the color rubber composition according to the present embodiment can be used to show, for example, letters, symbols, or graphics in a side portion, such as the side wall, to improve decoration and design of the tire. Accordingly, a tire (a pneumatic tire) according a preferred embodiment has a color rubber portion formed of the color rubber composition at a side portion of the tire, for example, the side wall.

The upper and lower limits of various numeric ranges, including contents, mass ratios, and mass %, may be freely combined, and all such combinations are deemed to be included as preferred numeric ranges in this specification.

EXAMPLES

The following describes Examples of the present invention. It is to be noted, however, that the present invention is not limited by the descriptions of the following Examples.

The components used in Examples and Comparative Examples are as follows.

Natural rubber: SIR 20
Chlorobutyl rubber: "CHLOROBUTYL 1066" manufactured by Japan Butyl Co., Ltd.
EPDM: "EP33" manufactured by JSR Corporation
Clay: "HARDBRIGHT" manufactured by Takehara Chemical Industrial Co., Ltd.
Silica: "ULTRASIL VN3" manufactured by Evonik Industries
Titanium oxide: "A-190" manufactured by Sakai Chemical Industry Co., Ltd.
Magnesium oxide: "KYOWAMAG 150" manufactured by Kyowa Chemical Industry Co. Ltd.
Zinc oxide: "ZINC OXIDE, GRADE 2" manufactured by Mitsui Mining & Smelting Co., Ltd.
Stearic acid: "LUNAC S-20" manufactured by Kao Corporation
Blue pigment MB: A masterbatch as a mixture of 50 mass % of a blue pigment formed of copper phthalocyanine, 30 mass % of SBR (styrene-butadiene rubber), and 20 mass % of mineral oil
Red pigment MB: A masterbatch as a mixture of 50 mass % of a red pigment formed of an azo compound, 30 mass % of SBR (styrene-butadiene rubber), and 20 mass % of mineral oil
Vulcanization accelerator 1: "NOCCELER DM-P" manufactured by Ouchi Shinko Chemical Industrial Co., Ltd.
Vulcanization accelerator 2: "NOCCELER D" manufactured by Ouchi Shinko Chemical Industrial Co., Ltd.
Vulcanization accelerator 3: "VULTAC 5" manufactured by ARKEMA
Sulfur: "POWDER SULFUR" manufactured by Tsurumi Chemical Industry Co., Ltd.
Wax A: A petroleum wax having the following normal/iso ratio and carbon number distributions
(1) Normal/iso (mass ratio): 82/18
(2) Carbon number distribution for iso components in the whole petroleum wax (mass %):
25 or less carbon atoms: 0.3%
26 to 32 carbon atoms: 3.6%
33 to 44 carbon atoms: 13.4%
45 or more carbon atoms: 0.6%
(3) Carbon number distribution for normal components in the whole petroleum wax (mass %):
25 or less carbon atoms: 11.1%
26 to 32 carbon atoms: 36.6%
33 to 44 carbon atoms: 34.0%
45 or more carbon atoms: 0.3%
Wax B: A petroleum wax having the following normal/iso ratio and carbon number distributions
(1) Normal/iso (mass ratio): 79/21
(2) Carbon number distribution for iso components in the whole petroleum wax (mass %):
25 or less carbon atoms: 0.3%
26 to 32 carbon atoms: 6.8%
33 to 44 carbon atoms: 11.2%
45 or more carbon atoms: 2.3%
(3) Carbon number distribution for normal components in the whole petroleum wax (mass %):
25 or less carbon atoms: 10.6%
26 to 32 carbon atoms: 44.9%
33 to 44 carbon atoms: 20.6%
45 or more carbon atoms: 3.4%
Wax C: A petroleum wax having the following normal/iso ratio and carbon number distributions
(1) Normal/iso (mass ratio): 83/17
(2) Carbon number distribution for iso components in the whole petroleum wax (mass %):
25 or less carbon atoms: 0.2%
26 to 32 carbon atoms: 4.1%
33 to 44 carbon atoms: 11.4%
45 or more carbon atoms: 1.2%
(3) Carbon number distribution for normal components in the whole petroleum wax (mass %):
25 or less carbon atoms: 9.3%
26 to 32 carbon atoms: 44.2%
33 to 44 carbon atoms: 27.0%
45 or more carbon atoms: 2.6%

The normal/iso ratios and the carbon number distributions of waxes A to C were measured using a capillary GC measurement device with a polyimide-coated capillary column. Measurements were made with carrier gas helium at a flow rate of 4 mL/min and a rate of temperature increase of 15° C./min in a temperature range of 180° C. to 390° C. In order to find the number of carbon atoms of isoalkanes, all the peaks between carbon numbers (N) and (N−1) of normal alkanes in the gas chromatography chart were determined as isoalkanes of N carbon atoms. The content was determined as a proportion relative to total 100 mass % of normal alkanes and isoalkanes.

Examples 1 and 2 and Comparative Examples 1 and 2

In a first mixing stage, compounding ingredients other than sulfur or vulcanization accelerators were added and kneaded with the rubber components in the formulations (parts by mass) shown in Table 1, using a Banbury mixer (dump temperature=160° C.). In a final mixing stage, sulfur and a vulcanization accelerator were added and kneaded with the kneaded material (dump temperature=90° C.) to prepare each color rubber composition.

The color rubber composition was vulcanized at 160° C.×30 minutes to prepare a test piece, and was evaluated for ozone resistance. The color rubber composition was also evaluated for hue change after exposure to outside environment. The evaluation methods are as follows.

Ozone Resistance

The test piece was left to stand for 24 hours under 10° C., 100 pphm ozone concentration conditions at 50% elongation in compliance with JIS K6259, and was visually inspected for the presence or absence of cracking in rubber surface. In Table 1, "Present" means that cracks were observable, and "Absent" means that cracks were unobservable with the naked eye.

Hue Change

The color of the test piece was measured with a spectrophotometer ("CR-200" manufactured by Konica Minolta) after the test piece was exposed to outside environment for 6 months. After calculations of hue changes based on ΔE, the hue change was evaluated according to the following criteria. Smaller values of ΔE mean smaller hue changes before and after exposure to outside environment, and hence a more desirable appearance.

A: ΔE is less than 5.0
B: ΔE is 5.0 or more and less than 7.5
C: ΔE is 7.5 or more

TABLE 1

|  | Comparative Example 1 | Comparative Example 2 | Example 1 | Example 2 |
|---|---|---|---|---|
| Formulation (parts by mass) | | | | |
| Natural rubber | 40 | 40 | 40 | 40 |
| Chlorobutyl rubber | 40 | 40 | 40 | 40 |
| EPDM | 17 | 17 | 17 | 17 |
| Clay | 70 | 70 | 70 | 70 |
| Silica | 15 | 15 | 15 | 15 |
| Magnesium oxide | 1 | 1 | 1 | 1 |
| Zinc oxide | 5 | 5 | 5 | 5 |
| Stearic acid | 3 | 3 | 3 | 3 |
| Wax A | — | 8 | — | — |
| Wax B | — | — | 8 | — |
| Wax C | — | — | — | 8 |
| Blue pigment MB | 10 | 10 | 10 | 10 |
| Vulcanization accelerator 1 | 2.0 | 2.0 | 2.0 | 2.0 |
| Vulcanization accelerator 2 | 0.4 | 0.4 | 0.4 | 0.4 |
| Vulcanization accelerator 3 | 0.7 | 0.7 | 0.7 | 0.7 |
| Sulfur | 2.0 | 2.0 | 2.0 | 2.0 |
| Evaluation | | | | |
| Ozone resistance | Present | Absent | Absent | Absent |
| Hue change | B | B | A | A |

The results are shown in Table 1. In Comparative Example 1 that did not contain a petroleum wax, the rubber composition was more susceptible to ozone degradation, and the ozone resistance was inferior. Comparative Example 2 contained a petroleum wax. However, because the petroleum wax was wax A that did not satisfy the conditions (2) and (3), the rubber composition whitened after exposure to outside environment, and showed a large hue change, though the ozone resistance was superior. Examples 1 and 2 contained waxes B and C, respectively, that satisfied the foregoing conditions (1) to (3). Accordingly, the ozone resistance was superior in Examples 1 and 2, and the rubber compositions had less whitening after exposure to outside environment, and showed smaller hue changes. The hue change was smaller and more desirable in Example 1 that used wax B.

Examples 3 and 4 and Comparative Examples 3 and 4

Color rubber compositions were prepared in the same manner as in Example 1, except that the formulations (parts by mass) shown in Table 2 were used. The color rubber compositions were evaluated for ozone resistance and hue change, in the same manner as in Example 1.

TABLE 2

|  | Comparative Example 3 | Comparative Example 4 | Example 3 | Example 4 |
|---|---|---|---|---|
| Formulation (parts by mass) | | | | |
| Natural rubber | 40 | 40 | 40 | 40 |
| Chlorobutyl rubber | 40 | 40 | 40 | 40 |
| EPDM | 17 | 17 | 17 | 17 |
| Clay | 70 | 70 | 70 | 70 |
| Titanium oxide | 15 | 15 | 15 | 15 |
| Magnesium oxide | 1 | 1 | 1 | 1 |
| Zinc oxide | 5 | 5 | 5 | 5 |
| Stearic acid | 3 | 3 | 3 | 3 |
| Wax A | — | 8 | — | — |
| Wax B | — | — | 8 | — |
| Wax C | — | — | — | 8 |
| Red pigment MB | 10 | 10 | 10 | 10 |
| Vulcanization accelerator 1 | 2.0 | 2.0 | 2.0 | 2.0 |
| Vulcanization accelerator 2 | 0.4 | 0.4 | 0.4 | 0.4 |
| Vulcanization accelerator 3 | 0.7 | 0.7 | 0.7 | 0.7 |
| Sulfur | 2.0 | 2.0 | 2.0 | 2.0 |
| Evaluation | | | | |
| Ozone resistance | Present | Absent | Absent | Absent |
| Hue change | C | C | B | B |

The results are shown in Table 2. The ozone resistance was inferior in Comparative Example 3 that did not contain a petroleum wax. In Comparative Example 4 that contained wax A that did not satisfy the conditions (2) and (3), the rubber composition showed large hue changes due to whitening, though the ozone resistance was superior. Examples 3 and 4 contained waxes B and C, respectively, that satisfied the conditions (1) to (3). Accordingly, the ozone resistance was superior in Examples 3 and 4, and hue changes due to whitening were smaller than in Comparative Example 4. The hue change was smaller and more desirable in Example 3 that used wax B.

While there have been described certain embodiments of the invention, it will be understood that the embodiments are illustrative, and are not intended to limit the scope of the invention. These embodiments may be implemented in many modifications, and various omissions, replacements, and changes may be made thereto within the gist of the invention. It is intended that the embodiments and all such modifications, including omissions, replacements, and changes, made thereto fall within the scope and the gist of the invention, and in the invention set forth in the appended claims and equivalents thereto.

What is claimed is:

1. A color rubber composition for tires, comprising 100 parts by mass of a rubber component, 0.2 to 20 parts by mass of a pigment other than black or white, 0.5 to 15 parts by mass of a petroleum wax, and 10 to 150 parts by mass of a white filler, the petroleum wax containing normal alkanes and isoalkanes, and having a normal/iso ratio of 70/30 to 90/10 as a mass ratio of normal alkane to isoalkane, the isoalkane content in the whole of the petroleum wax being 1.0 mass % or less for isoalkanes having 25 or less carbon atoms, 4.0 to 8.0 mass % for isoalkanes having 26 to 32 carbon atoms, 5.0 to 15.0 mass % for isoalkanes having 33 to 44 carbon atoms, and 1.0 mass % or more for isoalkanes having 45 or more carbon atoms, the normal alkane content in the whole of the petroleum wax being 5.0 to 18.0 mass % for normal alkanes having 25 or less carbon atoms, 40.0 to 48.0 mass % for normal alkanes having 26 to 32 carbon atoms, 15.0 to 27.5 mass % for normal alkanes having 33 to 44 carbon atoms, and 2.0 mass % or more for normal alkanes having 45 or more carbon atoms.

2. The color rubber composition for tires according to claim 1, wherein the rubber component comprises a diene rubber, butyl rubber, and ethylene propylene diene rubber.

3. The color rubber composition for tires according to claim 1, wherein the rubber component comprises natural rubber, butyl rubber, and ethylene propylene diene rubber.

4. The color rubber composition for tires according to claim 1, wherein 100 parts by mass of the rubber component comprises 20 to 60 parts by mass of natural rubber, 20 to 60 parts by mass of butyl rubber, and 5 to 30 parts by mass of ethylene propylene diene rubber.

5. The color rubber composition for tires according to claim 1, wherein the pigment other than black or white comprises at least one selected from the group consisting of an inorganic pigment, a polycyclic pigment, an azo pigment, a lake pigment, and a fluorescent pigment.

6. The color rubber composition for tires according to claim 1, wherein the white filler comprises at least one selected from the group consisting of silica, clay, calcium carbonate, manganese oxide, titanium oxide, magnesium oxide, and zinc oxide.

7. The color rubber composition for tires according to claim 1, wherein the white filler comprises 30 to 100 parts by mass of clay, and 5 to 30 parts by mass of silica and/or titanium oxide relative to 100 parts by mass of the rubber component.

8. The color rubber composition for tires according to claim 7, wherein the white filler further comprises 0.1 to 5 parts by mass of magnesium oxide, and 1 to 10 parts by mass of zinc oxide relative to 100 parts by mass of the rubber component.

9. A tire comprising the color rubber composition for tires of claim 1.

10. A tire comprising the color rubber composition for tires of claim 2.

11. A tire comprising the color rubber composition for tires of claim 3.

12. A tire comprising the color rubber composition for tires of claim 4.

13. A tire comprising the color rubber composition for tires of claim 5.

14. A tire comprising the color rubber composition for tires of claim 6.

15. A tire comprising the color rubber composition for tires of claim 7.

16. A tire comprising the color rubber composition for tires of claim 8.

17. The color rubber composition for tires according to claim 1, wherein the normal/iso ratio of the petroleum wax is 75/25 to 85/15, the isoalkane content in the whole of the petroleum wax is 0.5 mass % or less for isoalkanes having 25 or less carbon atoms, 4.0 to 7.0 mass % for isoalkanes having 26 to 32 carbon atoms, 8.0 to 13.0 mass % for isoalkanes having 33 to 44 carbon atoms, and 1.0 to 4.5 mass % for isoalkanes having 45 or more carbon atoms, the normal alkane content in the whole of the petroleum wax is 8.0 to 13.0 mass % for normal alkanes having 25 or less carbon atoms, 42.0 to 46.0 mass % for normal alkanes having 26 to 32 carbon atoms, 17.0 to 27.5 mass % for normal alkanes having 33 to 44 carbon atoms, and 2.0 to 6.0 mass % for normal alkanes having 45 or more carbon atoms.

18. A tire comprising the color rubber composition for tires of claim 17.

* * * * *